(No Model.)

7 Sheets—Sheet 1.

C. SEBASTIAN.
CASH REGISTER, INDICATOR, AND CHECK PRINTER.

No. 512,753.

Patented Jan. 16, 1894.

WITNESSES.

INVENTOR
Charles Sebastian
By Paul Bakewell
Atty.

C. SEBASTIAN.
CASH REGISTER, INDICATOR, AND CHECK PRINTER.
No. 512,753. Patented Jan. 16, 1894.
FIG. 2.
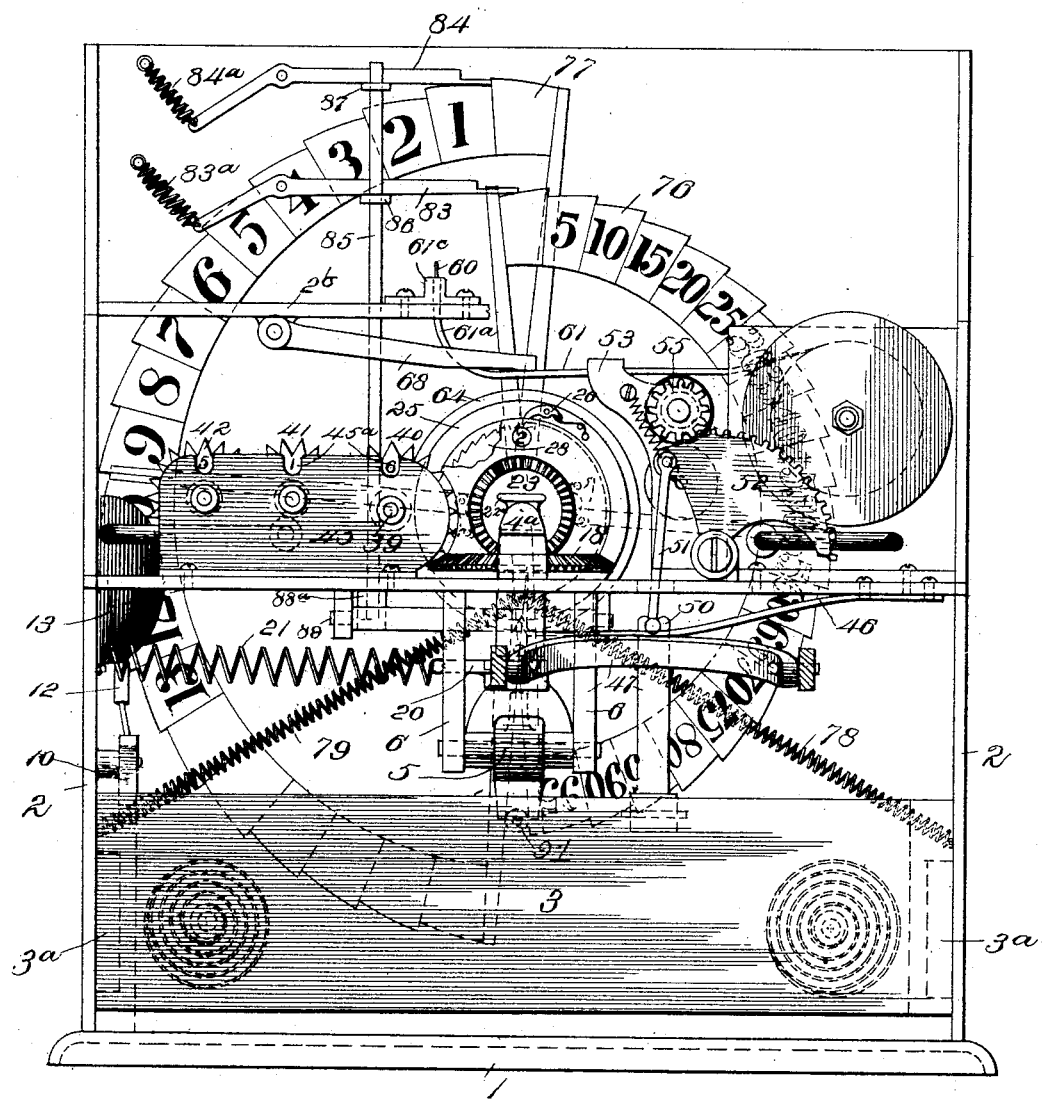
Fig. 2ª
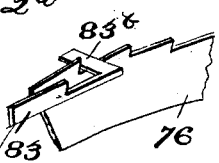
WITNESSES.
F. R. Cornwall
A. Rames
INVENTOR.
Charles Sebastian
By Paul Bakewell
Atty.

(No Model.) 7 Sheets—Sheet 4.

C. SEBASTIAN.
CASH REGISTER, INDICATOR, AND CHECK PRINTER.

No. 512,753. Patented Jan. 16, 1894.

WITNESSES.
F. R. Cornwall
A. Rames

INVENTOR.
Charles Sebastian
By Paul Bakewell
Atty

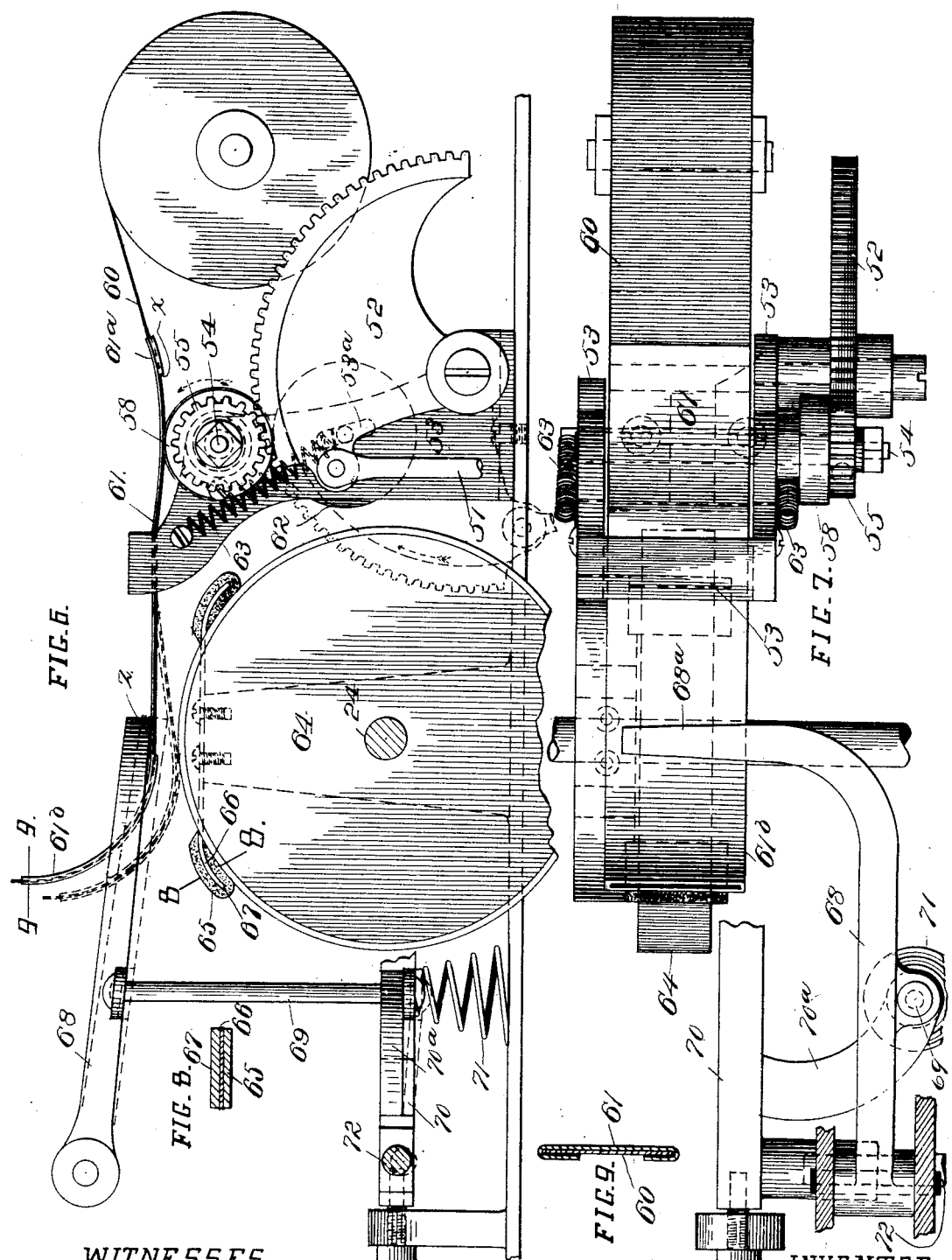

(No Model.) 7 Sheets—Sheet 6.
C. SEBASTIAN.
CASH REGISTER, INDICATOR, AND CHECK PRINTER.
No. 512,753. Patented Jan. 16, 1894.
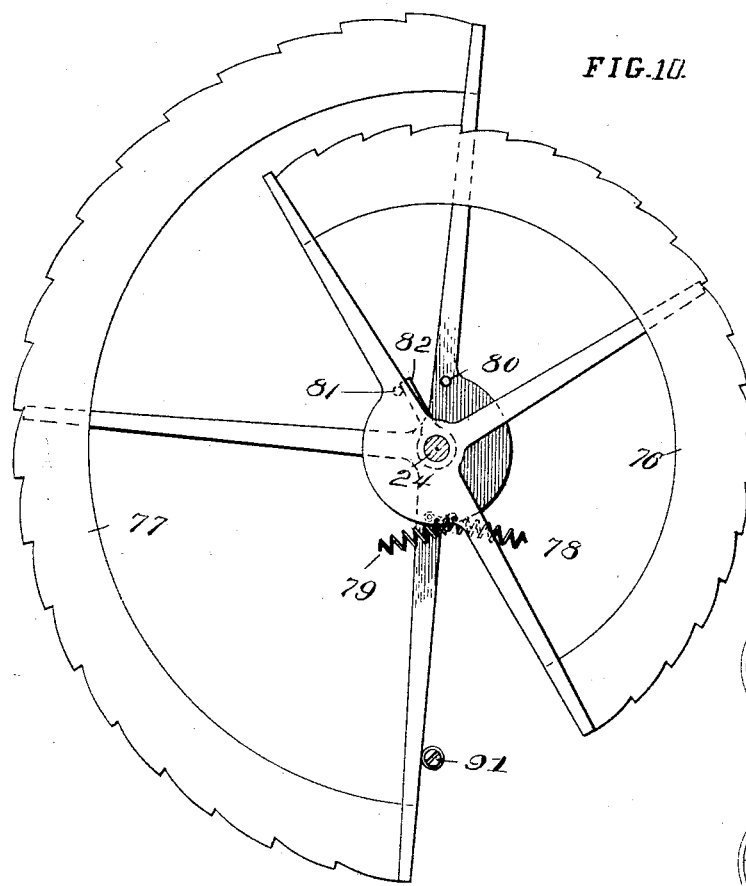
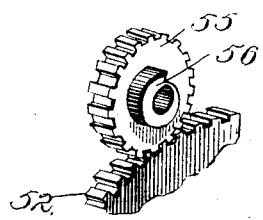
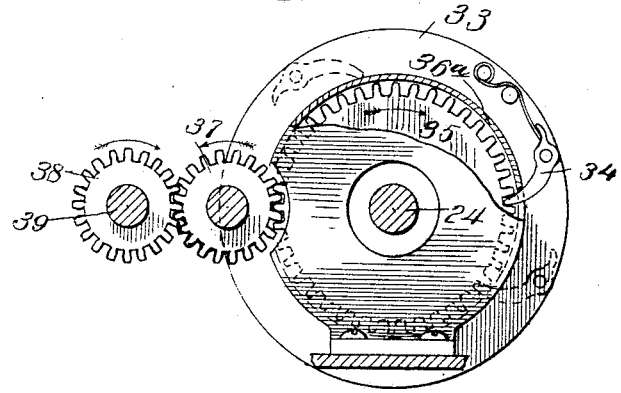
WITNESSES.
F. R. Cornwall
A. Rames
INVENTOR.
Charles Sebastian
By Paul Bakewell
Atty.

(No Model.)  7 Sheets—Sheet 7.

C. SEBASTIAN.
CASH REGISTER, INDICATOR, AND CHECK PRINTER.

No. 512,753.  Patented Jan. 16, 1894.

Witnesses
Inventor
Charles Sebastian
By Paul Bakewell
Atty.

UNITED STATES PATENT OFFICE.

CHARLES SEBASTIAN, OF SALEM, ASSIGNOR, BY MESNE ASSIGNMENTS, TO THE COMMERCIAL CASH REGISTER COMPANY, OF EAST ST. LOUIS, ILLINOIS.

CASH REGISTER, INDICATOR, AND CHECK-PRINTER.

SPECIFICATION forming part of Letters Patent No. 512,753, dated January 16, 1894.

Application filed August 18, 1892. Serial No. 443,393. (No model.)

*To all whom it may concern:*

Be it known that I, CHARLES SEBASTIAN, a citizen of the United States, residing at Salem, in the county of Marion and the State of Illinois, have invented certain new and useful Improvements in Cash-Registers, of which the following is a full, clear, and exact description, reference being had to the accompanying drawings, wherein—

Figure 1:
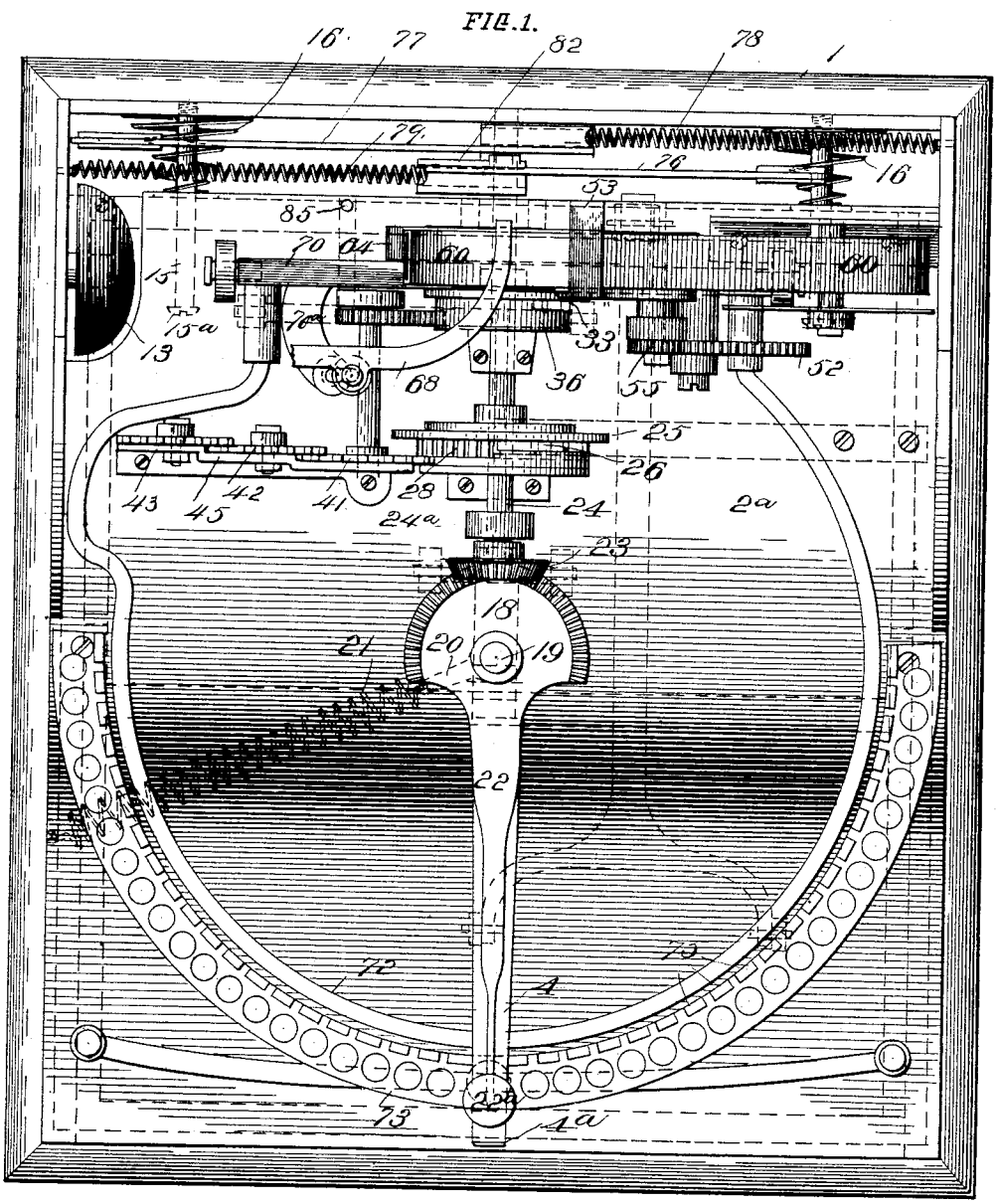
Figure 3:
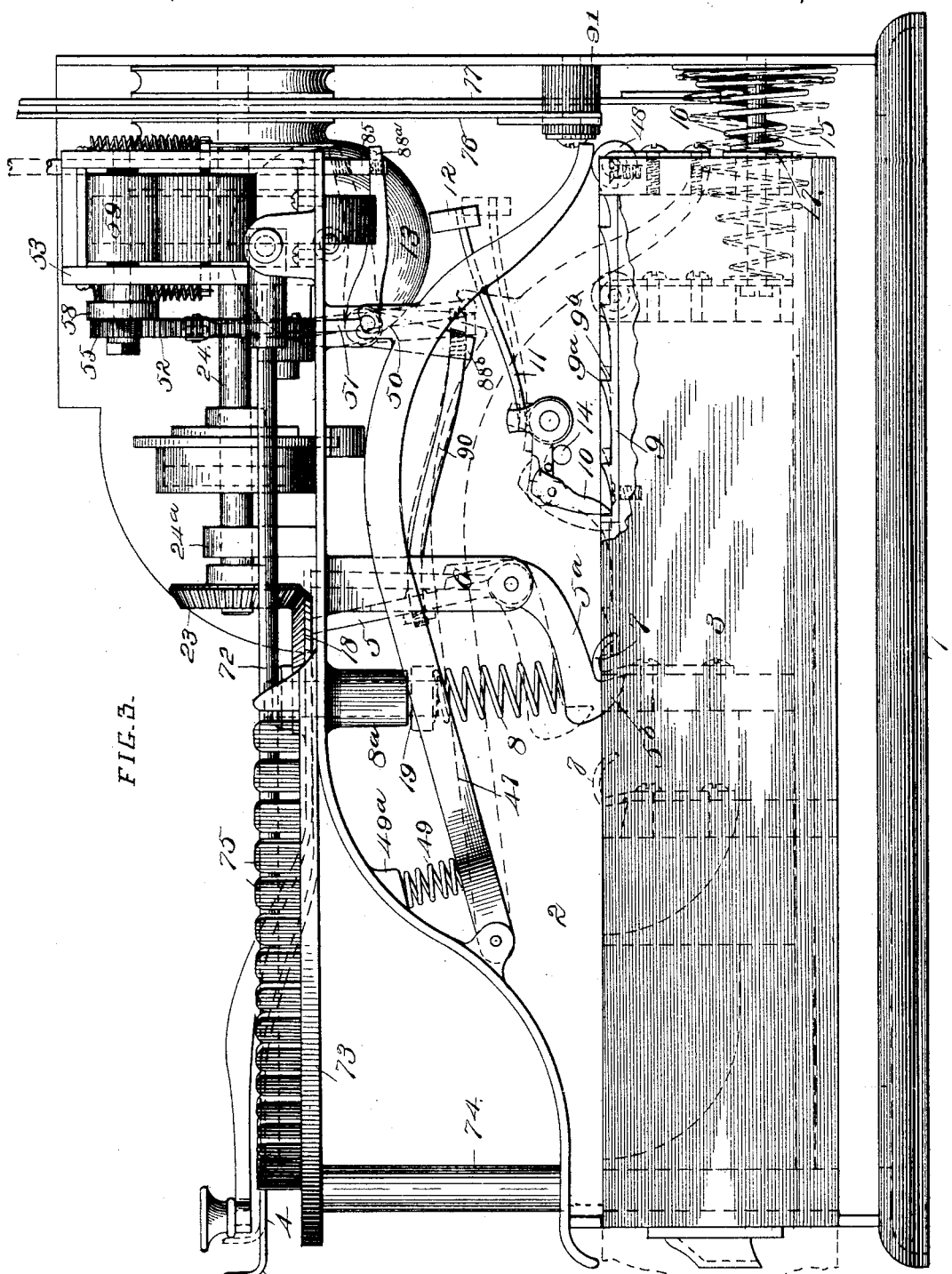
Figure 4:
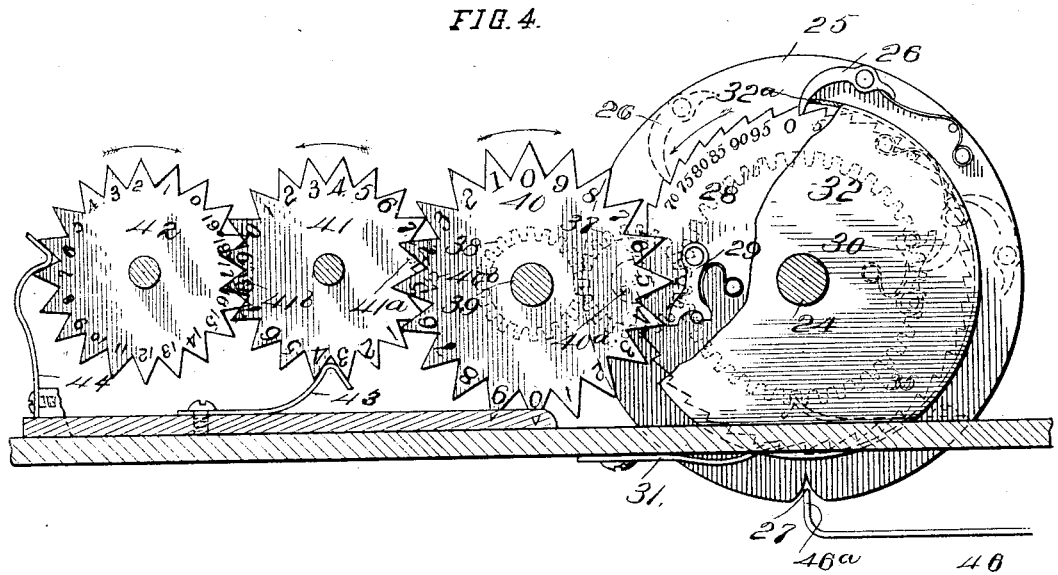
Figure 5:
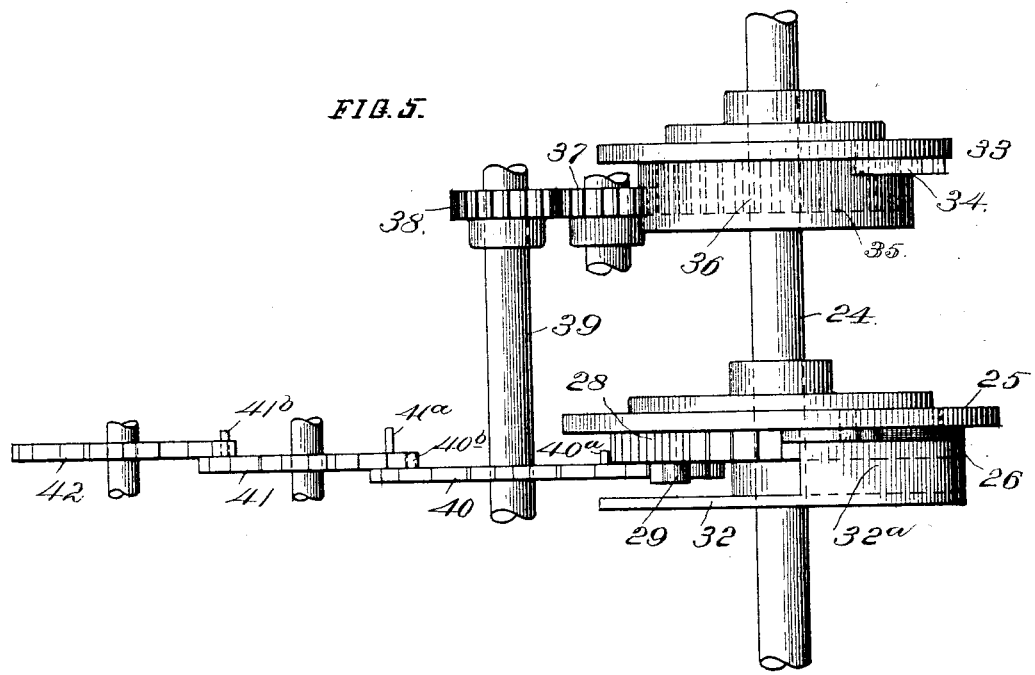
Figure 15:
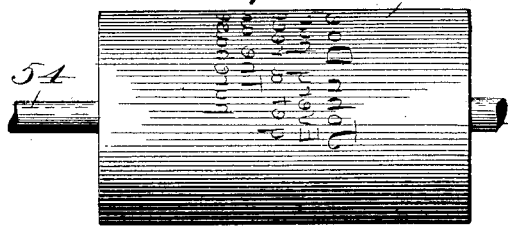
Figure 16:
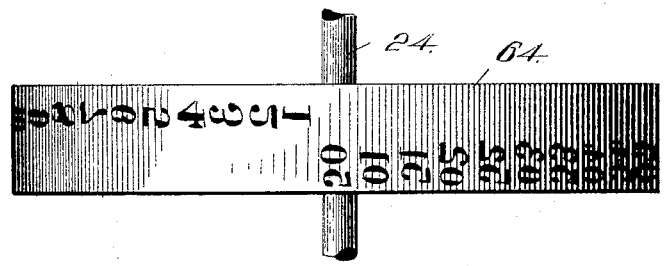
Figure 17:
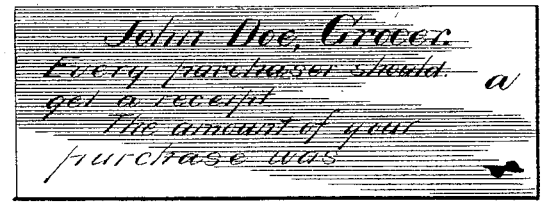
Figure 18:
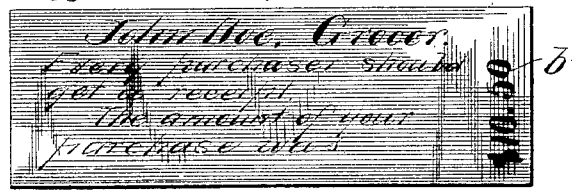

Figure 1 is a top plan-view of the operating mechanism, the cover of the casing being removed. Fig. 2 is a front elevation of the same, the segmental indicator-bank being omitted. Fig. 2ª is a view of a detached portion of one of the indicating dials, and its restraining pawl. Fig. 3 is a side elevation of the machine, one side of the casing being removed to more clearly illustrate the interior mechanism. Fig. 4 is a detail front elevation of the adding mechanism. Fig. 5 is a top plan-view of the same. Fig. 6 is a front elevation of the printing mechanism. Fig. 7 is a top plan-view thereof. Fig. 8 is a detail sectional view of the inking pad for the printing cylinder, taken on line 8—8 of Fig. 6. Fig. 9 is a detail sectional view of the paper-guide, taken on line 9—9, Fig. 6. Fig. 10 is a detached front elevation of the visible indicating dials and their means of actuation. Fig. 11 is a detached view, partly in section, of one of the ratchet and pawl mechanisms for operating the adding wheels. Figs. 12 and 13 are detached views, in elevation, of the pawl and ratchet mechanism for the supplemental printing cylinder or roll. Fig. 14 is a detached perspective, taken from the rear, of the pinion, its ratchet, and a portion of its operating segment. Fig. 15 is an elevation of the receipt-printing roll. Fig. 16 is a similar view, enlarged, of the type-wheel and its printing characters. Fig. 17 represents a receipt or check before it has received an impression of the type-wheel. Fig. 18 is a similar view of the receipt after receiving the impressions from the type-wheel, of the amount of the purchase.

My invention has relation to cash-registers and indicators, the primary object being to make visible the amount of individual sales, add the same to the general sum already registered, and, simultaneously therewith, to issue a check or receipt to the purchaser, of the amount of his purchase. Incidental to this fundamental object, are means adapted to be actuated by the actuation of the indicating, registering, and printing mechanism, whereby characters or advertising cards may be issued to the purchaser, the same having been printed on the check or receipt, by an automatic printing-roll or cylinder, which insures a proper position of the amount of the purchase, relative to the characters or printing-matter on the check.

With these objects in view, the first feature of the invention resides in the means for locking the indicating and registering mechanism, when the drawer is in a closed position; second, in providing means to be operated by the closing drawer, to issue a check or receipt to the purchaser; third, in the peculiar construction and arrangement of the means for locking the drawer in a closed position, impelling the same when the catch is released, and arranging an audible signal adapted to be actuated upon the forward movement of the drawer; fourth, in the means for operating the adding and registering mechanism from a shaft adapted to move in opposite directions; fifth, in the means for moving the visible indicating-dials in opposite directions from the same shaft; sixth, in combining the adding and registering mechanism with the oppositely-moving indicating-dials, whereby the former will be actuated simultaneously with the latter, from a shaft having a motion in either of the two directions; seventh, in the peculiar construction and arrangement of the cylinder or roll carrying the printed characters, on the shaft adapted to rotate in different directions, and the means for guiding and feeding the paper thereto, and in giving the imprinting blow; eighth, in the peculiar arrangement of the feed-roller or receipt-printing roll in advance of the cylinder carrying the figures, the amount of which is to be registered and printed; ninth, in the means for locking the registering and adding mechanism, and issuing the receipt by the closing movement of the drawer; tenth, in the location of the actuating mechanism for the feed or receipt-printing roll, whereby the same is actuated by the movement of the drawer; eleventh, in combining with the segmental indicating depressing bank, of a continuous depressing bar, and arranging a hammer to give the imprinting blow on the printing-roll or cylinder from the depression of the bar; twelfth, in the peculiar formation of the visible indication dials, whereby the same are locked in their indicating positions after the amount is registered, and in providing means adapted to be operated by the drawer to release said indication-dials and permit their return to "zero," before another amount is registered and indicated; thirteenth, in combining with the means for locking the drawer in a closed position, of mechanism adapted to be actuated by the releasing device for the drawer, to release the indicating dials, and, finally, in the construction, arrangement, and combination of several minor details of invention, all as will hereinafter be described, and, afterward, pointed out in the claims.

These objects I attain by the construction illustrated in the accompanying drawings, forming a part of this specification, wherein like symbols of reference refer to like parts wherever they occur, in which—

1 indicates the base of the machine, to which are secured the side-walls or panels 2—2, which, in turn, support the panels $2^a$, $2^b$, &c.

3 indicates the cash-drawer mounted upon guide-ways $3^a$ secured to the inside of the side panels, said drawer being provided with coin wells, in its front portion, and partitions in the rear (not shown), for the reception of bills, notes, &c., as is common.

As the mechanism for indicating, registering, and adding is dependent upon the opening of the drawer before it can be actuated, as will hereinafter be described, I shall first proceed with the description and operation of the several correlative means for operating the cash-drawer.

Slidingly mounted in, and projecting a little forward of the segmental indicator-bank, is the drawer-tripping slide 4, the forward end $4^a$ being bent, as shown in Fig. 3, to enable the operator to command a greater area upon which to exert an inward push to release the drawer. Secured to the rear end of this sliding trip in any suitable manner, is the upper member of a spring-impelled angle-lever 5, which is journaled in the bearings 6 projecting from the under side of the panel $2^a$, and whose other member, $5^a$, is preferably curved forward and terminates in a downwardly-projecting nose $5^b$, which, when at rest, or in its normal position, is directly in the path of a yielding catch 7, secured to the drawer 3.

8 represents a spring, the upper end of which has a bearing against the lug $8^a$ projecting from panel $2^a$, and whose other or lower end finds a bearing upon and impinges against the member $5^a$ of the angle-lever 5, thus always tending to exert a downward pressure on said member, and normally return the nose $5^b$ and its associate parts to their normal positions.

To sound an alarm upon the opening of the drawer, I mount in the upper edge of one of its rear partitions, or side walls, as in this instance, a toothed plate 9, from the upper surface of which project teeth or lugs $9^a$ formed with abrupt shoulders or reduced portions $9^b$, which are adapted to engage and operate a pivoted dog 10, to which is attached a vibrating rod 11 carrying the bell-hammer 12 on its free end.

13 indicates the bell; 14, a stop placed in juxtaposition to the shank of dog 10, to limit its downward movement, the operation of which will presently be described.

Passing through an opening $3^b$ in the rear wall of the drawer 3, is a guide-bolt 15, around which, is coiled a spiral spring 16, the forward end of which impinges against a follower 17, of a diameter larger than the opening $3^b$ in the drawer, and against the side edges of which the follower is adapted to rest when the drawer is in a closed position. When the nose $5^b$ is disengaged from the catch 7, the spring 16 exerting a pressure against the follower 17, will impel the drawer 3 until the follower has come in contact with the head $15^a$ on the guide-bolt, at which point, the impellent action of the spring 16 against the drawer is stopped; the impetus, however, derived from the expansion of the spring, is sufficient to throw the drawer outward a convenient distance to afford easy access to its compartments.

Coincident with the impellent movement of the drawer, is the actuation of the pivoted dog 10, which rides up over the teeth or lugs $9^a$, and falls of its own gravity into the recessed or reduced portion $9^b$, at which time, the hammer is forced upward, and, by reason of its supporting wire 12 being made yielding, will, on account of the weight of the hammer, communicate a vibratory motion thereto, which brings the hammer in contact with the bell. When the drawer is pushed home, the dog 10 being pivoted upon its supporting shank at $10^a$, will be permitted to swing backward and ride over the teeth $9^a$ and fall of its own gravity into position. A suitable stop-pin $10^b$ is mounted on the shank near the upper end of the dog, which will limit its forward movement, and cause a positive and direct movement to be communicated to the shank when the drawer is moving forward. The guide-bolt 15, being in the path of the opening $3^b$ in the rear wall of the drawer, will pass therethrough and the follower being caught by the side edges of the opening, will be forced backward, compressing the springs 16 ready for another operation. The drawer, by this time, will have been pushed to such a distance as to permit the engagement of the catch 7 with the nose $5^a$, at which time the drawer will be retained in its closed position.

18 indicates a segment mounted upon a shaft 19, and having a bearing in lug $8^a$, the lower end of which shaft is provided with a laterally-projecting pin, or lug, to the free end of which is attached one end of a spring 21, the opposite end being secured to one of the side panels 2, the function of this spring being to return the segment and its associate parts to their normal positions after actuation. Projecting forwardly from this segment 18, is an operating handle, or lever, 22, upon the outer or free end of which, I, preferably, mount a knob 22ª, for convenience in handling.

23 indicates a pinion meshing with the segment 18, and mounted upon a master shaft 24, which has suitable bearings in blocks 24ª, projecting from the panel 2ª. This shaft 24, I shall term a master-shaft, as it not only controls the adding and registering mechanism, but it has connected thereto, and actuates, the printing and indicating mechanism, as will hereinafter be described.

Rigidly connected to the master shaft 24, are disks 25 and 33 (see Figs. 4 and 5), the former carrying a spring-controlled pawl 26, and being notched in its lower end, as at 27.

28 indicates a ratchet-wheel, loosely mounted on the master shaft 24 in juxtaposition to the disk 25, which is adapted to be actuated in one direction by the pawl 26, and carry with its engagement pawls 29 and 30, (one of which, 30, being shown in dotted lines, Fig. 4.)

31 indicates a leaf-spring, adapted to engage the teeth of the ratchet and prevent any return movement thereof.

32 represents a shield for the ratchet, in which, is formed an opening whereby the figures thereon may be read in connection with those on the "dollar," "tens-of-dollars," and "hundreds-of-dollars" wheels of the adding mechanism, which latter wheels are, also, inclosed in a casing provided with similar "reading" openings. (See Fig. 2.)

Extending inwardly from the shield, or casing, 32, which is rigidly secured, preferably, to the panel 2ª of the machine, is a flange, or pawl-track, 32ª, against the end of which, pawl 26, rests, when in its normal position.

When the disk 25 is moved to the left, enabling its pawl 26 to engage the teeth of the ratchet-wheel 28, to register any amount under a dollar, which, in this instance five will be a sub-multiple, the pawls 29 and 30 being placed diametrically opposite each other, (or at the terminus of twenty ratchet-teeth, the wheel containing forty,) will engage the dollar wheel, and move the same one notch at each half revolution, or, when twenty teeth have been moved from a given point, which is termed "zero." Of course, it is understood that the "reading" opening in the shield, or casing, 32, is located relative to the actuation of the dollars wheel, by the pawls 29 and 30, so as to enable a correct "reading" to be obtained. The above operation of moving the disk 25 and ratchet-wheel 28 to the left, is dependent upon the movement of the handle 22 to the left, which, carrying with it the segment 18, will transmit a rotary motion to the pinion 23 and its rigidly-secured master shaft 24, upon which, the disk 25 is fixedly mounted.

To register from one to nineteen dollars, or any intermediate number of dollars, the handle 22 is moved to the right, which will rotate the master shaft 24 to the right, in which instance, the pawl 26 will ride over the pawl-track 32ª, as shown in dotted lines to the right of Fig. 4, thus entirely disengaging the pawl from its contact with the teeth.

Mounted rigidly to the master shaft 24 and to the rear of the disk 25, is another disk 33, upon one face of which is also mounted a spring-controlled pawl 34, (see Fig. 11 and dotted lines Fig. 4,) which is adapted to engage and rotate, when moved to the right, a gear-wheel 35 which is loosely mounted on shaft 24. Inclosing this gear-wheel is a shield, or casing, 36, provided with an inwardly-extending pawl-track 36ª, whose function is similar to that of the track 32ª, it, however, disengaging the pawl 34 when the master shaft 24 is moved in an opposite direction (to the left) from that which enables the pawl 26 to engage the wheel 28. It will be noted that the pawls 26 and 34 mounted upon the disks 25 and 33 will engage their respective wheels 28 and 35 only when the disks are rotated to the left, in the former instance, and, to the right, in the latter. The opposite or reverse movement of the disks and their pawls, in both instances will ride the pawls on the tracks 32ª and 36ª, as before mentioned.

Meshing with the wheel 35, is an intermediate idle pinion 37, which transmits a rotary movement to the pinion 38, mounted upon a shaft 39, upon the opposite end of which is mounted the dollars-wheel 40, which latter, as shown, is serrated, and placed in such a position so as to be operated upon by the pawls 29 and 30. This wheel 35 is provided with forty teeth, and engages, as before stated, the idler 37, which, in turn, meshes with the pinion 38, provided, in this instance, with twenty teeth. Through the medium of this train of gearing, one-quarter turn of the handle 22 to the right, will rotate master shaft 24 through the medium of the pinion 23, meshing with segment 18, one-half revolution; and, as the disk 33 with its pawl 34 is in engagement with the wheel 35, it will communicate one-half revolution thereto, which will, in turn, rotate the pinion 38 through the medium of the idler 37, one complete revolution, or rotate the dollars-wheel to a given point in proportion to the degree of turn of the handle 22. It will, also, be noted in this connection, that the number of depression notches in the spacer-indicator segment, or bank, correspond to the number of teeth on the dollars-wheel 40, but it is obvious, that the number of depression-notches and teeth on the several wheels may be changed, and suitable intermediate gearing substituted to actuate the several indication or "reading" wheels, to correspond therewith and give a correct reading.

Overlapping the "dollars" wheel 40, is a similar indication or reading wheel 41, journaled in suitable bearings projecting from the panel 2ª. This wheel 41, which I shall term a "tens-of-dollars" wheel, is adapted to be rotated one notch at a time by the alternate engagement of pins 40ª and 40ᵇ projecting from the side of the "dollars" wheel 40, so that one complete revolution of the "dollars" wheel (provided with twenty teeth) will move the "tens-of-dollars" wheel two notches. I also provide the "tens-of-dollars" wheel 41 with similar pins 41ª and 41ᵇ, the function of which, being similar to those of the pins 40ª and 40ᵇ on the "dollars" wheel 40, and are adapted to engage with and move a "hundreds-of-dollars" wheel 42, in juxtaposition thereto.

43 and 44 indicate leaf-springs secured to the panel 2ª or other suitable support, the function of which being to fall into the notches on the wheels 41 and 42 and prevent a return movement or any accidental displacement, whereby inaccurate reading might result.

45 represents a casing and support for the journals of the several wheels 40, 41 and 42, and is provided with suitable "reading" openings 45ª as shown in Fig. 2.

Secured to the under side of the panel 2ª, is a yielding plate or leaf spring 46, the free end of which 46ª, is bent up and adapted to fall into the notch 27 in the lower edge of the disk 25. When the spring is forced upwardly by the closing of the drawer, (as will, hereinafter, be described) it will lock the master shaft 24 and its associate parts in their normal positions.

Pivoted to the under side of the panel 2ª, near the front of the machine, is an arm 47, the rear or free end of which being formed with an ogee or cyma-reversa curve, as shown in Fig. 3. The under side of this arm 47, normally rests against an anti-friction roller 48, mounted in bearings on the rear upper edge of the drawer 3, from which engagement, taken in connection with the pivotal point of the arm and its curve at this point, will permit the arm to assume a position, as shown by dotted lines in Fig. 3; such downward movement being materially assisted by gravity and the impellent action of a spring 49, one end of which impinges against a lug 49ª, projecting from the under side of the panel 2ª and its other end having a bearing against the upper face of the arm. The upper face of the arm, when in its raised position, comes in contact with the leaf-spring 46 and forces the upwardly-bent end of the same into the notch 27 in the disk 25, thus locking the master shaft 24 and preventing its rotation when the drawer is closed. Extending upwardly from this arm 47, near its rear end, is a lug or projection 50, which forms a universal connection with a rod or link 51, the opposite end of which is connected by a loose joint to a segment 52, mounted on the frame 53. (See Figs. 5, and 6.)

Mounted loosely upon a shaft 54, which is joined near the upper edge of the frame 53, is a pinion 55 meshing with the segment 52.

Projecting from the inner face of the pinion 55, into a pawl-drum 58 (which is fixedly mounted on the shaft 54), is a one-toothed cam 56, see Figs. 12 and 13 which engages a spring-controlled pawl 57, mounted in the drum 58.

59 indicates a cylinder or roll, upon the surface of which are secured printing characters of rubber or other suitable material (see Fig. 15) said characters contacting with the strip of paper 60, which passes on the under side of the paper-guide 61, acting, in this instance, in the capacity of a platen. When the segment 52 is moved to the left, as shown in dotted lines, Fig. 6, it rotates the pinion 55 to the right, which pinion carries with it the one-toothed cam 56, permitting in its rotation in this direction, the pawl 57 to remain stationary and inactive, by reason of the position of its free or engaging end with relation to its pivotal point. This rotation of the pinion and the one-toothed cam, causes the pawl to ride around on the face of the cam until the shoulder of the tooth passes the stationary pawl, at which time it will fall, by reason of its spring action, behind the tooth. This movement and operation just set forth, is dependent upon the outward movement of the drawer. When the drawer is forced home, as will hereinafter be described, the segment 52 will be moved to the right, rotating the pinion 55 to the left which carries with it the one-toothed cam, and by reason of the engagement of the pawl 57 with the cam 56, the drum 58, which is rigidly mounted on the shaft 54, will be rotated also, to the left. This carries the printing wheel 59 (which is also rigidly mounted on the shaft 54) around one revolution, to the left. Thus it will be seen, that when the drawer is moving outward, this printing attachment is assuming a position of operation, and as the pawl 57 and the tooth on cam 56 are located with respect to the printing characters on the wheel 59, the printing cylinder will be rotated one time, starting from a predetermined point, when the drawer is closed.

As shown in Fig. 15, the printing characters on the receipt or printing roll 59, are arranged so as to leave a blank space $a$ on the check (see Fig. 17), which not only permits the amount of a purchase to be printed thereon, but insures a positive and correct feed of a given length of paper to the wheel carrying the imprinting figures $b$ relative to the blank space $a$ which is to receive the figures of the amount of the purchase. (See Fig. 18.)

Loosely mounted in slots 53ª, in the side walls of the frame 53, is an inking roll 62, yieldingly contacting with the receipt or check roll 59, and whose shafts extend laterally beyond the side walls of the frame where they are revolubly mounted in the ends of springs 63, whose other ends are secured to the frame 53 at a point above.

Secured to the top cross-piece of the frame 53, is the paper-guide 61, the ends of which, 61$^a$ and 61$^b$, being folded over to grasp and guide the paper (see Fig. 9), while the remaining portion of the guide, between points $x$—$z$, is free and unobstructed, thus permitting the entire surface of the slip of paper to be presented to the impressions of the printing-rolls 59 and 64.

Mounted upon the master shaft 24, whose rear end is supported by a pillow-block 24$^a$, is a printing-wheel 64, upon the periphery of which (see Fig. 16), are secured two sets of printing characters, 64$^a$, corresponding with the numeral on the indicating dials said wheel 64 being adapted to be rotated in either direction with the master shaft 24, and present a figure character corresponding to the amount of the one registered and indicated, immediately beneath the hammer 68, which, striking against the upper surface of the paper-guide, will give the imprinting blow, and force the paper in contact with printing characters, these types 64$^a$ begin from a given point immediately beneath the type-hammer, when the parts are in a normal position, and are arranged in consecutive order in opposite directions, on opposite edges of the periphery of the wheel 64. To readily accomplish this, I, preferably, form the paper guide of spring metal, which will elevate the paper out of contact with the printing wheel after the blow has been given, the end 61$^b$ being curved upwardly, and loosely passing through a throat-plate 61$^c$ mounted on the panel 2$^b$.

65 indicates an inking-pad, for the type, on wheel 64, consisting of a spring-metal strip 66 mounted on the upper end of the pillow-block or post 24$^a$, the free ends being curved downwardly to conform to the periphery of the wheel, and provided with inking felts 67, as shown more clearly in Figs. 6, 7, and 8.

Pivotally mounted in lugs projecting from the under side of the panel 2$^b$, is a type-hammer 68, the inner free end of which is extended laterally so as to be placed immediately over a given point where the number, which has been registered and indicated, is located on the type-wheel. Connected with, and adapted to depress this hammer, is a connecting-rod 69, the lower end of which is connected to an extension or rocking-arm 70$^a$, projecting from a rock-shaft 70, which is mounted in suitable bearings extending from the panel 2$^a$.

71 indicates a spring placed beneath the end of the rocking-arm 70$^a$, the function of which is to elevate the arm and its connecting-rod to their normal positions.

The hammer 68 has a sliding connection with the rod 69, to accommodate the return of the latter to its full extent, should the hammer not be returned by the flexibility of the supporting paper-guide, upon which it rests and depends for its retraction.

72 indicates a depression-rod or bar substantially semicircular in form, and having its ends rigidly secured to the rock-shaft 70, said depression-bar extending forwardly and continuing around the inside of and parallel with the "spacer" segment 73. The "spacer" segment, as shown, consists of a semi-circular plate 73, the ends of which are secured to the panel 2$^a$ and its outer or forward extremity being supported by a post 74. Projecting from the interior perimeter of the segment 73, is a series of vertically-disposed spacing projections or tabs 75, placed equi-distantly apart, and forming therebetween a space for the reception of the handle 22, where the same is depressed to actuate the depression-bar 72, and rock the shaft 70 to actuate the hammer 68.

76 and 77 indicate the indicating-dials loosely mounted on the shaft 24, at its rear end, said dials being provided at their hubs with semi-circular peripherally-grooved bearing-blocks, in lower extremity of which grooves are secured one end of returning springs 78 and 79, respectively, the opposite ends of said springs being secured to the opposite panels 2 in the base.

80 and 81 indicate engagement-pins projecting from the inner face of the semi-circular hubs, their function being to normally rest, by reason of the tension of the springs 78 and 79, against the opposite sides of an operating rock-arm 82 rigidly mounted upon the shaft 24 between the hubs. The arm 82 being rigidly mounted on the master-shaft will move therewith and engage one of the pins 80 or 81 in its path, depending of course, upon the direction in which it moves. Should it move to the right, it will engage the pin 80, and carry around with it the dial 77 which will be retained in its indicating position by the pawl 84, as will hereinafter be described. Should the master-shaft 24 be rotated to the left, the arm 82 will engage the pin 81 and carry the indicating dial 76 to the left, when the pawl 83 will hold it in its indicating position.

It will be noted that the indicating-dials are of different diameters or sizes, the larger, in this instance, carrying numerals from 1 to 19, for the "dollars" indicating and registering mechanism, and the smaller being provided with numerals indicating from 5 to 95 cents, any number of which five is a sub-multiple.

To retain the dials 76 and 77 in their indicating positions, so that the amount of the sale will be visible until the drawer is again opened, I form a series of teeth or ratchets on their exterior periphery, corresponding to the figure-spaces thereon, with which engage spring-controlled pawls 83 and 84, pivoted to the panels 2$^b$ of the frame or casing of the machine. The former pawl 83 is provided with a spring 83$^a$, which normally holds it in contact with the dial 76, forcing the pawl into the ratchet-teeth on the periphery thereof, and engaging the pawl with the teeth until it is forced out of engagement. As the dial 76 moves in a direction toward the pawl when the latter should engage the teeth, I provide a lateral projection on the engaging end of the pawl, which rides upon and falls over the teeth and retains the dial in a "set" position. In the instance of the latter pawl 84, however, this is not necessary, as direct engagement can be made. I also provide the pawl 84 with a spring 84ª, to hold it in a normally operative position with the dial 77, as shown in Fig. 2.

It is desirable that the dials be released and permitted to return to "zero" at the time the drawer is opened, in order that they may be in an inactive position, ready for another "set." To accomplish this, and disengage the pawls from their respective dials by the opening of the drawer, I provide a vertically-disposed disengaging-rod 85 (which is guided in its vertical movement, by passing through an opening in the panel 2ᵇ) having laterally-extending lugs or collars 86 and 87 which project immediately beneath the pawls 83 and 84, and which, while not impeding the free movement of the pawls when they are moving over the ratchet teeth of their respective dials, will, when moved upward, engage the pawls, and force them out of contact with the teeth on the dials. The lower end of this disengaging-rod is connected to one arm 88ª of the bell-crank lever, which is provided with laterally-extending hub, mounted upon pivot-shaft 89, and whose other arm 88ᵇ is connected, by a connecting-rod 90, to the upper member of the angle-lever 5, which is actuated by the sliding tripping-rod 4.

The operation is as follows: The slide 4 is pushed inward, releasing the drawer, which is impelled by the spring 16. Simultaneously with the opening of the drawer, the rod 90 actuates the bell-crank lever 88ª—88ᵇ, and forces the rod 85 up, which carries with it the pawls 83 and 84, disengaging them from the indication-dials, and permitting the return of the latter to their normal position at "zero." I preferably project from the rear panel, a yielding stop 91, which will tend to decrease the strain of the spring 78 and 79 from being placed directly on the pins 80 and 81, when the dials are released, and, also, permit an easy return without undue noise and jar. Coincident with the opening of the drawer, is the sounding of the alarm, and the falling of the arm 47, which will rotate segment 52, through the medium of the rod 51, and "set" the one-toothed cam 56 in position for engagement with the pawl 59, the ratchet-cam 56, in the mean time, being permitted, in this reverse movement, to easily ride under the pawl. The locking-spring 46 is also released by the movement of the arm, which releases the disk 25, and allows the same, with the master shaft 24, to be operated to accomplish the adding, registering, and indicating mechanisms.

When the parts have assumed the positions as above set forth, the handle, 22, is then turned to the proper numeral on the "spacer" segment, to the right or left, as the case may be. This movement of the handle, to the right, for dollars, and the left for cents, will, in the former instance, rotate the master shaft 24 to the right, to which the disks 25 and 33, the printing-wheel 64 and the arm 82, are fixedly mounted, said disks, printing-wheel, and arm actuating their respective associate parts as hereinbefore described. When the handle has reached its proper space or the number sought to be registered, the dial 77 will present a numeral corresponding to the one which the handle is immediately over, the printing-wheel will present a similar printing character to the point of depression of the hammer 68, and the registering and adding mechanism will be operated from the disk 33, wheel 35, and transmitting pinions 37 and 38, to register and add to the general sum the amount of the number indicated. The handle is then depressed, carrying with it the depression-rod 72, which will actuate the hammer and force the check or receipt in printing contact with the character on the printing or type-wheel, said character, as illustrated in Fig. 16, being to the left of the wheel, leaving a blank space for the subsequent printing of the "cents" column of figures on the right, should it be desired. The handle being turned to the left to register an amount under one dollar, the disks 25 and 33, the printing-wheel and arm 82, are moved in an opposite direction from that formerly described, which throws the disk 25 into engagement with the ratchet-wheel 28 through its pawl 26, leaving the wheel 35 inactive, the pawl riding over its track 36ª. This movement also brings the "cents" column on the printing-wheel to receive the imprinting blow of the hammer 68, carrying the "dollars" column out of the way on the under side of the wheel. The arm 82 also engages the pin on the dial 76, and turns said dial to the left, indicating the number corresponding to the one reached by the handle on the "spacer" segment. The handle is then depressed, and the operation of printing is repeated. It will be noted that any movement of the handle 22 to the right or left, from its normally central position, will register and add to the general sum, the amount of the sale, and will always move the registering and adding mechanisms forward; the printing wheel 64 will be carried with the shaft and will "set" itself, by bringing the proper numeral in position under the type-hammer, if moved to the right, a number in the "dollars" column, and to the left for "cents," and the indicating dials will be moved toward each other, in opposite directions, to be "set." The issuance of the printed check or receipt is dependent upon the closing of the drawer, and is effected through the instrumentality of the arm 47 being raised, which rotates the segment 52 to the right (see dotted arrow, Fig. 6) through the connecting-rod 51. The segment being in mesh with the pinion 55 whose ratchet is in position to catch the pawl 57, will rotate said pinion to the left, which will carry with it the drum 58 and printing cylinder 59. As the printing cylinder is in direct engagement with the paper slip (which is obtained from a suitable roll, the location of which is not material in respect to whether it be inside or outside the casing), the rotation thereof will force the slip to the left, and, at the same time, print a blank check or receipt in advance of said check or receipt receiving an impression from the printing-wheel 64.

It is obvious that many minor changes in the construction and arrangement of the several features of my invention can be made and substituted for those herein shown and described, without, in the least, departing from the nature and principle of my invention, and, therefore, I do not wish to be understood as confining myself to the exact construction and arrangement of the several parts as herein shown and described.

Having thus described my invention, what I claim, and desire to secure by Letters Patent of the United States, is—

1. In a cash register and indicator, the combination with a master shaft, of a disk mounted thereon provided with a notch, a spring having its end bent up in line with the notch in the disk when the same is in its normal position, and an arm adapted to be operated by the drawer and force the bent end of the spring into the notch, and thereby lock the shaft, substantially as described.

2. In a cash register and indicator, the combination with a master shaft adapted to rotate in opposite directions, of a registering mechanism which receives motion in one direction from said shaft, a disk on the shaft provided with a notch, a yielding finger adapted to enter the notch when the shaft is in its normal position, and an arm controlled by the drawer for forcing the finger into the notch, substantially as described.

3. In a cash register and indicator, the combination with a master shaft adapted to rotate in opposite directions, of a printing wheel and disk mounted on the shaft, said disk being provided with a notch, a finger adapted to enter the notch when the shaft is in its normal position or position of rest, and means for forcing the finger into the notch, substantially as described.

4. In a cash register and indicator, the combination with the indicating dials, of a master shaft adapted to rotate in opposite directions, means for actuating the dials from the shaft, a disk mounted on the shaft provided with a notch, a finger adapted to enter the notch when the shaft is in a position of rest, and means for forcing the finger into the notch, substantially as described.

5. In a cash register and indicator, the combination with a master-shaft, of means for operating the same in opposite directions, registering, mechanism operated from said shaft in one direction while said shaft is rotating in either direction, a printing-wheel mounted on the shaft, and means controlled by the drawer for locking the shaft when the drawer is in a closed position, substantially as described.

6. In a cash register and indicator, the combination with a master-shaft, of means for rotating the same in opposite directions, registering mechanism which receives motion from said shaft in one direction when the shaft is rotating in either direction, indicating dials loosely mounted upon said shaft, and means for moving said indicating dials independently in opposite directions, substantially as described.

7. In a cash register and indicator, the combination with a master-shaft, of means for rotating the same in opposite directions, registering mechanism operated from and by said shaft in a forward direction only when said shaft is rotating in either direction, a printing-wheel mounted on said shaft and moving therewith, indicating dials loosely mounted upon and adapted to be moved in opposite directions from said shaft, and means for actuating the indicating dial, substantially as described.

8. In a cash register and indicator, the combination with a master-shaft, of means for rotating the same in opposite directions, registering mechanism operated from and by said shaft in a positive forward direction only when said shaft is rotating is either direction, a printing-wheel mounted upon and moving with the shaft, indicating dials loosely mounted upon said shaft, and means for moving said indicating dials, independently in opposite directions, substantially as described.

9. In a cash register and indicator, the combination with a master shaft adapted to rotate in opposite directions, of registering mechanism receiving motion in one direction from said shaft, a printing wheel rigidly mounted on the shaft and provided with two sets of printing characters, and means for giving the imprinting blow to the paper so as to take an impression from each set in a given space, substantially as described.

10. In a cash register and indicator, the combination with a master shaft adapted to rotate in opposite directions, of indicating dials loosely mounted thereon and adapted to receive motion in opposite directions from the shaft, and a printing wheel mounted on the shaft and having two sets of printing characters corresponding to the characters on the indicating dials, substantially as described.

11. In a cash register and indicator, the combination with the master shaft adapted to rotate in opposite directions, a printing and indicating mechanism mounted thereon, registering mechanism arranged at one side of the master shaft, the movement of said mechanisms being controlled by said shaft, a pinion on the shaft, a segment for operating the pinion, and a handle on the segment, substantially as described.

12. In a cash register and indicator, the combination with a master shaft, adapted to rotate in opposite directions, of a printing wheel mounted thereon provided with a set of type on each side, a pinion on the shaft, a segment engaging with and operating the pinion, a handle for operating the segment, and mechanism for communicating the imprinting blow operated by the depression of the handle, substantially as described.

13. In a cash register and indicator, the combination with a master shaft adapted to rotate in opposite directions, of registering, printing and indicating mechanisms, controlled by and operated from said shaft, a disk mounted on the shaft provided with a notch, a finger adapted to be forced into the notch when the shaft is in its normal position, and means for forcing the finger into the notch, substantially as described.

14. In a cash register and indicator, the combination with a master shaft adapted to rotate in opposite directions, of registering, printing and indicating mechanisms, controlled by and operated from said shaft, a pinion on the shaft, a segment provided with a handle, for operating the pinion, and means controlled by the drawer for locking the shaft, substantially as described.

15. In a cash register and indicator, the combination with a master shaft adapted to rotate in opposite directions, of a printing wheel mounted on the shaft, said wheel being provided with two sets of type, one on each side, reading in opposite directions, a paper strip, a platen therefor, a feed cylinder provided with printing characters, and means for operating the feed cylinder independently of the operating mechanism for the printing wheel, substantially as described.

16. In a cash register and indicator, the combination with a printing wheel provided with two sets of type, one on each side, reading in opposite directions, a paper strip, a guide therefor forming a platen, a feed cylinder provided with printing characters on its face from which cylinder the paper guide leads, to and beyond the printing wheel, and means for operating the wheel and cylinder, substantially as described.

17. In a cash register and indicator, the combination with a printing wheel and its means of operation, of a platen for said wheel, a cylinder which feeds the strip of paper to the wheel, said cylinder being provided with printing characters on its face, a continuous paper guide for the strip of paper, extending from the cylinder to the wheel, and means for actuating the cylinder by the movement of the drawer, substantially as described.

18. In a cash register and indicator, the combination with a master shaft adapted to rotate in opposite directions, of a printing wheel mounted on said shaft and provided with two sets of printing characters, one on each side leading in opposite directions a platen therefor, a pinion on the shaft, a segment provided with a handle for operating the pinion and shaft, a feed cylinder provided with printing characters, and means controlled by the drawer for actuating said feed cylinder, substantially as described.

19. In a cash register and indicator, the combination with a paper strip, of a printing wheel for printing the amount registered, a feed cylinder provided with printing characters on its face, for feeding the strip of paper to the printing wheel and means controlled by the drawer for rotating the cylinder from a predetermined point, in one direction, substantially as described.

20. In a cash register and indicator, the combination with a printing wheel for printing the amount registered, of a paper strip, a supplemental feed cylinder provided with printing characters on its face, and means controlled by the drawer for rotating the feed cylinder in one direction from a predetermined point, independently of the operating mechanism of the printing-wheel substantially as described.

21. In a cash register and indicator, the combination with a master-shaft adapted to rotate in different directions, of a printing-wheel mounted thereon for printing the amount registered, said wheel being provided with printing characters on its face reading in opposite directions means for actuating said shaft and wheel, a continuous strip of paper which receives an impression from the wheel, and mechanism controlled by the drawer for issuing a printed portion of the strip, substantially as described.

22. In a cash register and indicator, the combination with a master-shaft and means for operating the same in opposite directions, of a printing-wheel mounted thereon for printing the amount registered, said wheel being provided with printing characters on its face reading in opposite directions a continuous strip of paper which receives an impression from the printing-wheel, a feed cylinder provided with printing characters on its face, and means controlled by the drawer for rotating the printing cylinder and issuing a printed portion of the strip, substantially as described.

23. In a cash register and indicator, the combination with a paper strip and its guide, of a feed cylinder for the paper strip, a pinion loosely mounted on the shaft of the feed cylinder, a one toothed cam ratchet which is operated with and by the movement of the pinion, a drum rigidly mounted on the shaft, a pawl connected to said shaft at a relatively fixed position, which pawl engages the one toothed cam ratchet and when said ratchet is moved it will engage and operate said cylinder from a predetermined point in one direction, and means for rotating the pinion, substantially as described.

24. In a cash register and indicator the combination with a paper strip and mechanism for printing characters thereon, of a drawer, a swinging arm adapted to rest thereon when the drawer is closed, a feed cylinder for the paper strip, a pinion loosely mounted on its shaft, a pawl carried by the shaft adapted to engage the lug conjoined to the pinion and means for rotating the pinion by the movement of the swinging arm, substantially as described.

25. In a cash register and indicator, the combination with a paper strip, of a feed cylinder provided with printing characters on its face, inking rollers yieldingly contacting with said printing characters, a pinion loosely mounted on the shaft of the printing cylinder provided with a one toothed ratchet, a pawl which is carried by said shaft at a relatively fixed position, a segment which engages the pinion, a swinging arm, a connection between the segment and arm, and a drawer which is adapted to operate said arm, substantially as described.

26. In a cash register and indicator, the combination with a feed cylinder and its shaft, of a drum mounted on the shaft, a pawl in the drum, a pinion loosely mounted on the shaft formed with a ratchet face for engaging the pawl and rotating the shaft, a segment for rotating the pinion, and an arm located in the path of the drawer for operating the segment, substantially as described.

27. In a cash register and indicator, the combination with a combined printing cylinder and feeder and its shaft, of a supporting frame therefor which is provided with slots, an inking roller loosely mounted in the slots, and spiral springs mounted on each side of the frame having their ends formed in an eye to encircle the shaft of the inking roller, substantially as described.

28. In a cash register and indicator, the combination with a figure printing wheel, of a yielding paper guide, which, by its resiliency is held normally out of contact with said wheel and a type hammer for forcing the guide and its strip of paper in contact with the wheel to make an impression on the strip substantially as described.

29. In a cash register and indicator, the combination with the figure printing wheel, of a yielding paper guide and its contained strip of paper which by resiliency of the guide is normally held out of contact with the printing wheel, a type hammer for forcing the guide and strip of paper in contact with the wheel, and means for operating the hammer and rotating the wheel, substantially as described.

30. In a cash register and indicator, the combination with a printing wheel, of a yielding paper guide and its contained strip of paper which are normally held out of contact with the wheel by the resiliency of the paper guide, a type-hammer for forcing the guide and its strip of paper into contact with the wheel to make the imprinting blow, a rock-shaft having a rock-arm for operating the type-hammer and means for rocking the shaft.

31. In a cash register and indicator, the combination with the printing wheel, of a yielding paper guide and its contained strip of paper, a hammer for forcing the strip into contact with the wheel, a rock shaft provided with an arm which is connected to and operates said hammer, a spring under said arm, and means for rocking said shaft and arm, substantially as described.

32. In a cash register and indicator, the combination with the printing wheel, of a paper strip which is normally held out of engagement with the wheel, a hammer for forcing said strip in contact with the wheel, means for operating the hammer, and a yielding guide for the strip which elevates the hammer and strip of paper out of engagement with the wheel after depression, substantially as described.

33. In a cash register and indicator, the combination with the printing wheel and its means of operation of a semi-circular spacer segment provided with characters which determines the position of the printing wheel by the relative position of the handle which operates the printing wheel thereto, a depression bar extending around the interior periphery of said semi-circular spacer segment, and a hammer which is operated by said depression bar, substantially as described.

34. In a cash register and indicator, the combination with the spacer segment, of a depression bar, a swinging depressible handle adapted to actuate the depression bar, a hammer which gives the imprinting blow, and suitable connections between the depression bar and hammer, substantially as described.

35. In a cash register and indicator, the combination with the printing wheel, of a paper strip, a hammer for giving the imprinting blow, a depression bar for actuating the hammer, and a handle for controlling the rotation of the printing wheel and adapted to depress the depression bar, substantially as described.

36. In a cash register and indicator, the combination with a master shaft adapted to rotate in opposite directions, of two disks mounted thereon, pawls on said disks, notched wheels loosely mounted on the shaft, with which the pawls engage, and pawl tracks arranged to partially surround said ratchet wheels so that when the disks are moved either to right or left, only one pawl will engage its respective wheel, the other pawl riding on the pawl track, substantially as described.

37. In a cash register and indicator, the combination with a master shaft adapted to rotate in opposite directions, of an indication wheel loosely mounted thereon, means for operating said wheel when the shaft is rotating in one direction, a notched wheel which is moved one notch at a time from the indication wheel, a spur wheel loosely mounted on the shaft and geared to positively rotate the notched wheel when the shaft is rotating in an opposite direction, and means carried by the shaft for actuating the spur wheel in such opposite direction, substantially as described.

38. In a cash register and indicator, the combination with a master shaft adapted to rotate in opposite directions, of two respective disks mounted thereon, oppositely disposed pawls on the disks, a ratchet and gear wheel in juxtaposition to said disks and adapted to be rotated in opposite directions by their respective pawls, a notched registering wheel which is moved in one direction by the several wheels, and means for reversing the direction of rotation of one of said wheels in advance of its being transmitted to the notched wheel, substantially as described.

39. In a cash register and indicator, the combination with a master-shaft adapted to rotate in opposite directions, of two disks fixedly mounted thereon, oppositely disposed pawls on the respective disks, wheels loosely mounted on the shaft with which said pawls normally engage, means for disengaging one of the pawls from its wheel when the shaft is rotated in one direction, and a registering and adding mechanism which is actuated in one direction only by the oppositely movable wheels which are loosely mounted on the master shaft, substantially as described.

40. In a cash register and indicator, the combination with a master shaft adapted to rotate in opposite directions, of indicating dials loosely mounted thereon, an arm between the dials, and pins on the dials in the path of the arm, substantially as described.

41. In a cash register and indicator, the combination with a master shaft adapted to rotate in opposite directions, of indicating dials loosely mounted on the shaft, an arm on the shaft between the dials, pins on the dials in the path of the arm, and springs for returning the dials to the normal positions, substantially as described.

42. In a cash register and indicator the combination with a master shaft adapted to rotate in opposite directions, of indicating dials loosely mounted thereon, and formed with teeth on their peripheries, pawls adapted to hold the dials in a "set" position by their engagement with the dial teeth, and means for disengaging the pawls from the teeth and permitting a simultaneous return of the dials to their normal positions, substantially as described.

43. In a cash register and indicator the combination with a master shaft adapted to rotate in opposite directions, of indicating dials loosely mounted thereon, pins on the dials, and an arm on the shaft adapted to engage said pins and move one of the dials to a "set" position when the shaft is rotating in either direction, and means for holding the dials in their "set" position, substantially as described.

44. In a cash register and indicator, the combination with a master-shaft adapted to rotate in opposite directions, of indicating dials, loosely mounted on the shaft, pins on the dials, and an arm on the shaft for engaging pins and moving the dials when the shaft is rotating in either direction, means for holding the dials in their "set" positions, and means actuated by the drawer for releasing the dials and permitting their return to "zero," substantially as described.

45. In a cash register and indicator, the combination with a master shaft adapted to rotate in opposite directions, of indicating dials loosely mounted on the shaft and provided with teeth on their peripheries, of means on the shaft for moving the dials in opposite directions, pawls for engaging the teeth and holding the dials in a "set" position, a rod for disengaging the pawls from the dials, and mechanism controlled by the drawer for actuating the rod, substantially as described.

46. In a cash register and indicator, the combination with a master shaft adapted to rotate in opposite directions, of oppositely movable dials loosely mounted thereon, means on the shaft for moving the dials in opposite directions, teeth on the dials, pawls engaging the teeth to hold said dials in a set position, a rod for releasing the pawls, operated by the drawer releasing mechanism, and the drawer releasing mechanism, substantially as described.

47. In a cash register and indicator, the combination with oppositely movable dials and their means of operation, teeth on the periphery of the dials, pawls for engaging the teeth and holding the dials in a "set" position, a releasing rod for the pawls, a bell-crank lever to which the rod is connected, drawer releasing mechanism, and a connection between the other arm of the bell crank lever and the drawer releasing mechanism, substantially as described.

48. In a cash register and indicator, the combination with oppositely movable indicating dials having teeth on their peripheries, yielding pawls engaging said teeth, one of said pawls being provided with a lateral projection or lug by which it engages the teeth, a rod for releasing the pawls, and means for operating the rod, substantially as described.

49. In a cash register and indicator, the combination with the drawer, of a toothed or shouldered plate mounted thereon, a bell, a pivoted vibratory bell hammer, and a pivoted dog for vibrating the bell hammer by riding over the teeth and falling by gravity to the rear thereof, substantially as described.

In testimony whereof I affix my signature, in presence of two witnesses, this 19th day of July, 1892.

CHARLES SEBASTIAN.

Witnesses:
F. R. CORNWALL,
A. RAINES.